(12) United States Patent
Aspacher et al.

(10) Patent No.: US 12,662,011 B2
(45) Date of Patent: Jun. 23, 2026

(54) METHOD AND CHARGING SYSTEM FOR CHARGING AN ELECTRICAL ENERGY STORAGE DEVICE OF AN ELECTRICALLY DRIVEN VEHICLE

(71) Applicant: Mercedes-Benz Group AG, Stuttgart (DE)

(72) Inventors: Alexander Aspacher, Weil der Stadt (DE); Juergen Benecke, Ludwigsburg (DE); Urs Boehme, Ehningen (DE)

(73) Assignee: Mercedes-Benz Group AG, Stuttgart (DE)

( * ) Notice: Subject to any disclaimer, the term of this patent is extended or adjusted under 35 U.S.C. 154(b) by 603 days.

(21) Appl. No.: 18/258,109

(22) PCT Filed: Dec. 15, 2021

(86) PCT No.: PCT/EP2021/085823
§ 371 (c)(1),
(2) Date: Jun. 16, 2023

(87) PCT Pub. No.: WO2022/136044
PCT Pub. Date: Jun. 30, 2022

(65) Prior Publication Data
US 2024/0100982 A1    Mar. 28, 2024

(30) Foreign Application Priority Data
Dec. 21, 2020    (DE) ..................... 10 2020 007 867.2

(51) Int. Cl.
*B60L 53/62*        (2019.01)
*B60L 53/16*        (2019.01)

(52) U.S. Cl.
CPC .............. *B60L 53/62* (2019.02); *B60L 53/16* (2019.02); *B60L 2210/10* (2013.01);
(Continued)

(58) Field of Classification Search
CPC ....................................................... B60L 53/62
(Continued)

(56) References Cited

U.S. PATENT DOCUMENTS

| | | | |
|---|---|---|---|
| 2006/0152180 A1 | 7/2006 | Tahara et al. | |
| 2012/0098487 A1* | 4/2012 | Hooker | B60L 53/62 |
| | | | 320/109 |

(Continued)

FOREIGN PATENT DOCUMENTS

| | | |
|---|---|---|
| DE | 10 2013 011 104 A1 | 1/2015 |
| DE | 10 2014 217 921 A1 | 3/2016 |

(Continued)

OTHER PUBLICATIONS

German-language European Office Action issued in European Application No. 21 839 149.8 dated Jan. 5, 2026 (10 pages).
(Continued)

*Primary Examiner* — Yalkew Fantu
(74) *Attorney, Agent, or Firm* — Crowell & Moring LLP

(57)    ABSTRACT

A method for charging an energy storage device of a vehicle. A charging process of the energy storage device is carried out with a charging device of the vehicle. In a first phase of the charging process, the energy storage device is charged with a first DC voltage of the charging source in dependence on a charging current of the charging source. A battery voltage of the energy storage device is determined during the charging process and is compared with the charging voltage of the charging source. A voltage transformer is operated in dependence on the comparison. In a second phase of the charging process, the energy storage device is charged with a second DC voltage of the voltage transformer in dependence on a choke current of the voltage transformer.

6 Claims, 9 Drawing Sheets

(52) U.S. Cl.
CPC ... *B60L 2240/529* (2013.01); *B60L 2240/547*
(2013.01); *B60L 2240/549* (2013.01)

(58) Field of Classification Search
USPC ........................................................ 320/109
See application file for complete search history.

(56) References Cited

U.S. PATENT DOCUMENTS

| | | | |
|---|---|---|---|
| 2016/0009184 A1* | 1/2016 | Lee | B60L 50/15 |
| | | | 318/139 |
| 2020/0062138 A1* | 2/2020 | Smolenaers | B60L 53/53 |
| 2020/0130535 A1* | 4/2020 | Robert | B60L 58/24 |
| 2020/0164755 A1 | 5/2020 | Smolenaers | |

FOREIGN PATENT DOCUMENTS

| | | |
|---|---|---|
| DE | 10 2015 101 187 A1 | 7/2016 |
| DE | 10 2015 016 651 A1 | 9/2016 |
| DE | 10 2017 009 352 A1 | 4/2018 |
| DE | 10 2017 009 355 A1 | 4/2018 |
| DE | 10 2017 010 390 A1 | 5/2018 |
| DE | 10 2018 006 810 A1 | 2/2019 |
| DE | 10 2019 118 400 A1 | 1/2020 |
| DE | 10 2019 007 867 A1 | 7/2020 |
| DE | 10 2019 202 014 A1 | 8/2020 |
| DE | 102020004780 A1 * | 11/2020 ............. B60L 58/10 |
| JP | 2016-10193 A | 1/2016 |
| JP | 2016-226281 A | 12/2016 |
| JP | 2019-4593 A | 1/2019 |

OTHER PUBLICATIONS

PCT/EP2021/085823, International Search Report dated Apr. 5, 2022 (Two (2) pages).
German-language German Office Action issued in German application No. 10 2020 007 867.2 dated Aug. 12, 2021 (Thirteen (13) pages).
German-language German Office Action issued in German application No. 10 2020 007 867.2 dated Mar. 2, 2022 (Twelve (12) pages).
Cho et al., "Analysis of the Effect of the Variable Charging Current Control Method on Cycle Life of Li-ion Batteries", *Energies*, vol. 12, No. 15, Aug. 6, 2019, 11 pages, XP055905977, URL: https://www.mdpi.com/journal/energies.
Japanese-language Japanese Office Action issued in Japanese Application No. 2023-536347 dated Jun. 6, 2024 (3 pages).

\* cited by examiner

METHOD AND CHARGING SYSTEM FOR CHARGING AN ELECTRICAL ENERGY STORAGE DEVICE OF AN ELECTRICALLY DRIVEN VEHICLE

BACKGROUND AND SUMMARY OF THE INVENTION

One aspect of the invention relates to a method for charging an electrical energy storage device of an electrically driven vehicle.

Furthermore, the invention relates to a charging system for charging an electrical energy storage device of an electrically driven vehicle.

Electrically driven vehicles, such as electric vehicles, have a voltage level of up to 800 volts. By contrast, the DC charging columns used today only provide a maximum output voltage of 750 volts.

A large number of DC charging columns only have a maximum output voltage of 500 volts. Therefore, a downward compatibility to a DC charging column with a maximum voltage level of 500 volts can be used to charge the electric vehicle. The lower voltage can be converted here to the higher voltage level by means of a boost converter.

When charging an 800-volt vehicle at a 700-volt charging column, the vehicle must be designed so that its voltage level is less than or equal to 750 volts or so that the electric vehicle also has a corresponding boost converter in order to carry out the charging process by means of the boost converter right from the start. However, in this case, the boost converter and its performance may be decisive for the service life of the electric vehicle. Due to costs and/or dimensions (power density), it is unfavourable to keep boost converters with very high power ratings (for example, greater than 150 kW) in the vehicle. Typical power values are, for example, 50 kW or a maximum of 150 kW. In order to keep the charging time short and at the same time keep the boost converter power low, it is recommended to start the charging process via a direct coupling between the charging column and the vehicle battery. As soon as the maximum charging voltage of the charging column is reached, the direct coupling is disconnected and the charging process is carried out via the boost converter. However, there are two challenges here that need to be solved. When switching between the charging process directly with the charging column and the charging process using the boost converter, charging may be interrupted. Likewise, during the transition of the charging operations from direct coupling to charging via the boost converter, the bypass contactors may be opened and the boost converter may continue the charging process, and therefore, due to the energy content stored in an output choke of the DC charging column ($W=0.5 \times L \times i^2$), there is a risk that a high overvoltage may be generated when connecting to an unpowered inductance in the boost converter, so that there is also a risk of charging interruption.

For example, in boost converters with capacitive energy storage devices (for example charge pump or voltage doubler), it is not possible to provide a smooth transition from charging via direct coupling to charging via a boost converter.

Documents DE 10 2015 101 187 A1, DE 10 2017 009 355 A1, DE 10 2017 009 352 A1 and DE 10 2017 010 390 A1 deal with converter types based on inductive energy storage devices. These have the following disadvantages, because, depending on how the transition from direct coupling to charging via the boost converter is performed, the charging process by the charging column may be interrupted in an unplanned fashion.

Thus, the object of the present invention is to make a DC charging process of an electrically driven vehicle more reliable in respect of charging interruption.

One aspect of the invention relates to a method for charging an electrical energy storage device of an electrically driven vehicle, wherein:

the electrically driven vehicle is coupled to a charging source external to the vehicle, a charging process of the electrical energy storage device is carried out with the coupled charging source external to the vehicle and a charging device of the electrically driven vehicle, and in a first phase of the charging process of the electrical energy storage device, the electrical energy storage device is charged, in dependence on a charging current of the charging source external to the vehicle, with a first DC voltage as charging voltage of the charging source external to the vehicle, wherein a battery voltage of the electrical energy storage device is determined during the charging process, the battery voltage of the electrical energy storage device is compared with the charging voltage of the charging source external to the vehicle by the charging device, a voltage transformer of the charging device of the electrically driven vehicle is operated in dependence on the comparison of the battery voltage with the charging voltage, wherein in a second phase of the charging process following the first phase, the electrical energy storage device is charged with a second DC voltage of the voltage transformer, which is higher than the charging voltage, in dependence on a choke current of the voltage transformer which is lower than the charging current.

With the provided method, a transition can be made between DC charging from direct coupling of the charging source with the electrical energy storage device to charging via the voltage transformer, in which no charging interruption due to an overvoltage or a reduction of the charging current to 0 amperes is to be expected. In particular, this is advantageous for a DC charging operation of an 800-volt vehicle at a 700-volt charging column. This mixed charging operation (charging via the direct coupling and charging via the voltage transformer) allows the vehicle to be charged faster than with a charging operation purely via the voltage transformer from the start time of the charging operation (assumption that the charging power of the voltage transformer is lower than the power when charging via the direct coupling).

In particular, the provided method can be used to avoid a charging interruption of the vehicle at a DC charging station. On the one hand, it can be achieved that the charging current drops to 0 amperes, since the change of the two charging variants (first and second phase, respectively) is only carried out when a choke of the voltage transformer is current-carrying. The closer the current values of the charging source and the voltage transformer are together, the lower is a voltage peak when changing between the first and second phase. It is therefore necessary to introduce a current in the voltage transformer choke that corresponds to the current of the charging source, before the change between the two phases of the charging process.

In particular, the provided method allows a stabilization of a DC charging process. In particular, the change from the first phase of the charging process to the second phase of the charging process follows in such a way that the charging current is equal to the choke current. In this way, inductive voltage peaks, which may lead to an interruption of the charging process for safety reasons, can be prevented.

The electrical energy storage device may be, for example, a traction battery or a battery assembly or a high-voltage battery. In particular, the electrical energy storage device has a voltage charge of 500 volts, in particular a maximum of 850 volts. An electrically driven vehicle is in particular an electric vehicle, or a hybrid vehicle, or a plug-in vehicle, or a purely electrically driven vehicle. In particular, the electrically driven vehicle has an electric drive motor or a drive unit or a drive assembly which is supplied with energy from the electrical energy storage device so that the electrically driven vehicle can be moved.

A charging source external to the vehicle may be, for example, a DC charging station or a DC charging column or a charging infrastructure or a charging system or a DC charging source. In particular, the vehicle source external to the vehicle may provide a DC voltage. In particular, the charging source external to the vehicle has a maximum voltage of 750 volts.

In particular, the charging process of the electrical energy storage device is carried out and monitored by means of the charging device. The charging device is in particular a charging unit of the electrically driven vehicle, such as an on-board charger inside the vehicle. In particular, the charging device may be part of an on-board electrical system of the electrically driven vehicle.

According to the invention, it is provided that in the first phase of the charging process, the electrical energy storage device is directly coupled to the charging source external to the vehicle by means of a bypass circuit of the charging device, so that the charging current of the charging source external to the vehicle flows directly to the electrical energy storage device, in particular the voltage transformer is bypassed in the first phase of the charging process by means of the bypass circuit. In particular, the voltage transformer is bridged or bypassed by means of the bypass circuit so that a direct current flow is established between the charging source external to the vehicle and the electrical energy storage device. In this way, the electrical energy storage device in particular can be electrically charged directly with the charging source external to the vehicle. This charging process or this direct charging process of the electrical energy storage device takes place until the voltage level of the electrical energy storage device is substantially the same as the voltage level of the charging source. For example, the charging source external to the vehicle may provide a voltage of maximum 750 volts, thus the electrical energy storage device may be charged up to a voltage of maximum 750 volts via the bypass circuit. In particular, the bypass circuit may comprise two paths or two voltage paths. On the one hand, the bypass circuit may be connected on the positive and on the negative voltage path respectively. Thus, for the charging process of the electrical energy storage device, both voltage potentials may be bypassed in relation to the voltage transformer.

According to the invention, it is provided that in the second phase of the charging process, the bypass circuit is switched current-free by means of at least one isolating element, as a result of which the current flow of the charging current of the charging source external to the vehicle to the electrical energy storage device is interrupted. In particular, the bypass circuit is disconnected by means of the at least one isolating element or isolating switch or contactor, thereby interrupting the direct current flow between the charging source external to the vehicle and the electrical energy storage device. In particular, the second phase takes place when the voltage level of the electrical energy storage device is substantially equal to the voltage level of the charging source external to the vehicle. Thus, there is a change between the first charging process, in which a direct current flow is established between the charging source and the energy storage device, to the second phase, in which the electrical energy storage device is charged indirectly via the voltage transformer. Thus, the charging current of the charging source does not flow via the bypass circuit to the electrical energy storage device, but now flows to the voltage transformer, so that the voltage transformer can be operated accordingly.

In a further exemplary embodiment of the invention, it is provided that, depending on the battery voltage of the electrical energy storage device, the voltage transformer is operated in such a way that the choke current is impressed in the choke of the voltage transformer depending on the charging current. In particular, after disconnection of the bypass circuit in the second phase, the current flow of the charging current takes place in the voltage transformer, in particular in the choke of the voltage transformer. Thus, by means of the current flow of the charging current of the charging source, the choke current can be impressed into the choke (inductance). In particular, the choke current is built up in the choke. In particular, the choke current is impressed in the choke in such a way that the choke current has a current value of 105 amperes or 110 amperes or 115 amperes or a current value between 105 amperes and 115 amperes. Accordingly, the current value of the charging current may be between 320 amperes and 380 amperes. Thus, a lower choke current is provided by means of the voltage transformer for charging the electrical energy storage device. Due to the lower choke current compared to the charging current, the voltage transformer can transform a higher voltage compared to the first DC voltage.

In a further exemplary embodiment of the invention, it is provided that in the second phase of the charging process, the charging current of the charging source external to the vehicle is adapted in dependence on the choke current, in particular a current value of the charging current is adapted to a current value of the choke current. Since the voltage transformer and in particular the choke of the voltage transformer only require a current of, for example, 110 amperes, the charging current, which initially has a triple value in contrast, is reduced. The current value of the charging current is reduced or commanded to the current value of the choke current, in particular by means of a buck converter of the charging source. Thus, the current values of the charging source and of the voltage transformer are matched. In this way, voltage peaks and/or voltage flashovers and/or switching effects caused by inductive interference between the two phases of the charging process can be prevented.

In particular, if the current values of the charging source and the voltage transformer are substantially close to each other, a reduction and/or decrease of voltage peaks when the isolating element of the bypass circuit is opened can be prevented.

The voltage values and current values given above are not to be understood as absolute values. The specified voltage and current values may contain deviations. These deviations may result from tolerances, in particular measurement tolerances. For example, the respective values may have a deviation of 5 percent, in particular 10 percent.

Another aspect of the invention relates to a charging system for charging an electrical energy storage device of an electrically driven vehicle, comprising:

a charging source external to the vehicle to provide a charging voltage, a charging port of the electrically driven vehicle for coupling the electrically driven vehicle to the charging source external to the vehicle, a charging device of the electrically driven vehicle for carrying out a charging process of the electrical energy storage device, wherein in a first phase of the charging process of the electrical energy storage device the electrical energy storage device can be charged in dependence on a charging current of the charging source external to the vehicle with a first direct voltage as charging voltage of the charging source external to the vehicle, characterized by a determination device for determining a battery voltage of the electrical energy storage device during the charging process, an evaluation unit designed to compare the battery voltage of the electrical energy storage device with the charging voltage of the charging source external to the vehicle, a voltage transformer of the charging device for providing a choke current lower than the charging current in dependence on the comparison between the battery voltage and the charging voltage, wherein the charging device is designed in such a way that, in a second phase of the charging process following the first phase, the electrical energy storage device is charged, in dependence on the choke current of the voltage transformer, with a second DC voltage of the voltage transformer which is higher than the charging voltage.

In particular, the charging system just described can be used to carry out a method according to one of the previous aspects or an embodiment thereof.

In particular, the charging system may be used to carry out a more efficient DC charging process of an electrically driven vehicle that is less susceptible to faults. In particular, the provided charging system allows a two-phase charging process in that, in a first phase, the electrical energy storage device is first charged directly via the charging source and, in a second, subsequent phase, the electrical energy storage device is charged via a voltage transformer. Thus, in particular, an electrical energy storage device (with a voltage level of 850 volts) can be efficiently charged by a DC charging column (maximum 750 volts). In particular, the provided charging system allows an efficient possibility for a fast-charging process.

According to the invention, the charging device has a bypass circuit for charging the electrical energy storage device in dependence on the charging current, wherein the bypass circuit is connected between a positive potential of the charging source external to the vehicle and a positive potential of the electrical energy storage device. By means of the bypass circuit, the electrical energy storage device can be charged directly with the charging source. In particular, the bypass circuit allows a direct current flow between the electrical energy storage device and the charging source. In particular, the bypass circuit may be a bypass branch or path. In particular, the bypass circuit may be connected between the positive potential (HV positive potential) and a positive potential (HV positive potential) of the charging source external to the vehicle and the electrical energy storage device. In particular, the bypass circuit is connected in the HV positive potential of the charging system. In other words, the bypass circuit is connected in the positive voltage path between the charging source and the electrical energy storage device. In particular, the bypass circuit allows a bypassing of the voltage transformer.

In particular, the bypass circuit can be connected not only to the positive voltage path but also to the negative voltage path. Thus, for example, one part of the bypass circuit can be connected between the positive potential of the charging source and the energy storage device and a second part of the bypass circuit can be connected between the negative potential of the charging source and the energy storage device.

In another exemplary embodiment of the invention, it is provided that a first connection side of the bypass circuit is connected to a primary side of the voltage transformer and a second connection side of the bypass circuit is connected to a secondary side of the voltage transformer. In other words, the voltage transformer can be electrically bypassed so that the charging current of the charging source does not flow via the voltage transformer but via the bypass circuit to the electrical energy storage device. Thus, a more efficient charging process of the electrical energy storage device can be carried out without unnecessarily loading the voltage transformer in the first phase of the charging process.

In a further exemplary embodiment of the invention, it is provided that an isolating element is connected between the first connection side of the bypass circuit and the second connection side of the bypass circuit, wherein the voltage transformer can be bridged with the isolating element. In particular, the isolating element can be an isolating switch or a protective element or a contactor. In particular, the isolating element can be used to switch the bypass circuit to allow current flow or to disconnect the bypass circuit. Thus, the isolating element can either ensure that the charging current is applied to the voltage transformer or that the charging current is applied to the bypass circuit.

In a further exemplary embodiment of the invention, it is provided that the voltage transformer is designed as a current-controlled step-up converter. Thus, the voltage transformer can be controlled in particular via the charging current of the charging source. In particular, the voltage transformer is controlled in such a way that the electrical energy storage device can be charged to the maximum. In particular, the voltage transformer converts the voltage of the charging source into a higher voltage for charging the electrical energy storage device.

Advantageous embodiments of the method are to be regarded as advantageous embodiments of the charging system. Likewise, advantageous embodiments of the method can be regarded as advantageous embodiments of the charging system. For this purpose, the charging system has material features which allow the method or an advantageous embodiment thereof to be carried out.

Further advantages, features and details of the invention will become apparent from the following description of preferred exemplary embodiments and from the drawings. The features and combinations of features mentioned above in the description as well as the features and combinations of features mentioned below in the description of the figures and/or shown alone in the figures may be used not only in the combination indicated in each case, but also in other combinations or in isolation, without departing from the scope of the invention.

DETAILED DESCRIPTION OF THE DRAWINGS

In the figures, functionally like elements are provided with the same reference signs.

Figure 1:
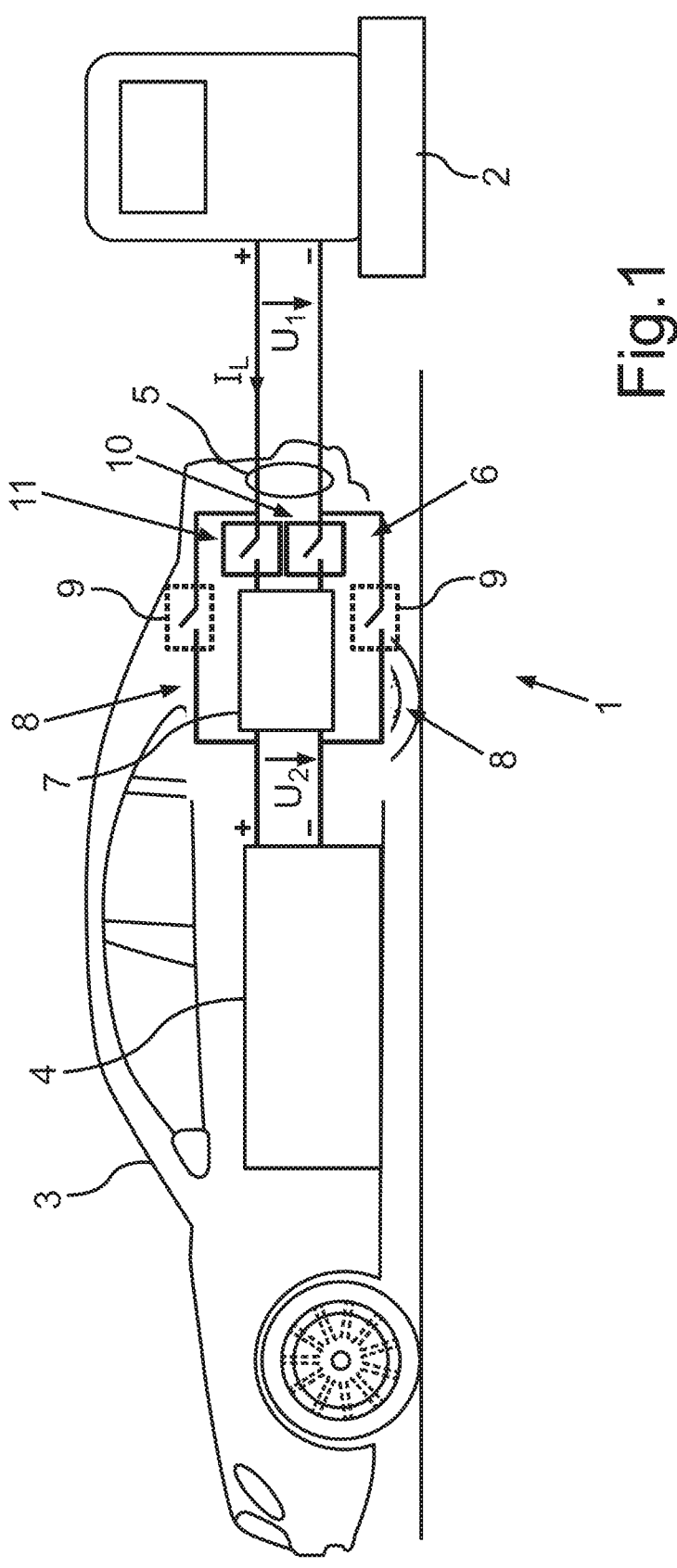
FIG. 1 shows a schematic side view of an exemplary embodiment of the charging system according to the invention.

FIG. 1 shows a schematic side view of an exemplary embodiment of the charging system 1 according to the invention. In particular, the charging system 1 has a charging source 2 external to the vehicle and an electrically driven vehicle 3. By means of the charging source external to the vehicle 2, in particular the electrically driven vehicle 3 can be charged. In other words, the charging system 1 comprises all components and/or units that are used in an electrical charging process of the electrically driven vehicle 3 at the charging source 2.

The electrically driven vehicle 3 is in particular an electric vehicle or a hybrid vehicle or a plug-in vehicle or a purely electrically driven vehicle. In particular, the electrically driven vehicle 3 is a vehicle with a maximum voltage of 850 volts. In particular, the electrically driven vehicle 3 has an electrical energy storage device 4. The electrical energy storage device 4 is a vehicle battery or an HV battery or a high-voltage battery or a battery assembly of the vehicle 3. In particular, the electrical energy storage device 4 has a voltage of 500 volts, in particular a maximum of 850 volts. In particular, an electrical drive unit or an electrical drive assembly or an electrical drive motor of the electrically driven vehicle 3 can be supplied with energy by means of the electrical energy storage device 4, so that the electrically driven vehicle 3 can be driven by means of the electrical energy storage device 4.

In order to be able to carry out a DC charging process of the electrical energy storage device 4, the electrically driven vehicle 3 can be connected or coupled to the charging source 2 via a charging port 5 of the vehicle 3 or a DC charging port. The charging source 2 can be, for example, the DC charging station or a DC charging column or a charging infrastructure or a charging system. In particular, the DC charging column (charging source 2) has a maximum voltage of 750 volts.

In particular, the electrically driven vehicle 3 has a charging device 6. The charging device 6 may, for example, be an on-board charger inside the vehicle or a charging unit inside the vehicle. The charging device 6 can be used in particular to carry out, control and in particular monitor the electrical charging process at the charging source 3.

For example, in a discharging state, the electrical energy storage device 4 may have, for example, 500 volts, in particular 600 volts, at its connection terminals.

For example, the charging device 6 comprises a voltage transformer 7. The voltage transformer 7 may be, for example, a step-up converter or a direct DC converter or a DC-DC converter. In particular, the voltage transformer 7 is designed to be able to convert or step-up a lower voltage of the charging source 2 into a voltage suitable for charging the electrical energy storage device 4. If the charging source 2 is able to supply a voltage suitable for the vehicle battery (electrical energy storage device 4), the voltage transformer 5 can, for example, be bridged or switched to voltage-free via a bypass circuit 8. For example, this can be done via isolating elements 9 (bypass contactors) of the bypass circuit 8. The bypass circuit 8 is in particular a bridging branch or a disconnecting branch. The isolating elements 9 may be contactors or isolating switches, for example. As can be seen in FIG. 1, a positive voltage branch and a negative voltage branch between the electrical energy storage device 4 and the charging source 2 may be bridged or not bridged, accordingly, by means of the bypass circuit 8. In particular, it is advantageous if the voltage transformer 7 is bypassed when the power of the voltage transformer 7 is lower than in comparison to a maximum charging power of the electrically driven vehicle 3 or the charging device 6.

Furthermore, the charging device 6 can, for example, have switching elements 11. By means of the switching elements 11, the charging port 5 on the vehicle side can be disconnected from the power supply, in particular when the vehicle 3 is moving or when the electrical energy storage device 4 is not charging. In particular, the switching elements 11 are contactors or switching units.

For example, the charging source 2 may be used to provide a first voltage U1 as the charging voltage for charging the electrical energy storage device 4. By contrast, a second DC voltage U2, which is higher than the charging voltage, may be provided for charging the electrical energy storage device 4 by means of the voltage transformer 7. In particular, the electrical energy storage device 4 is charged with the first voltage U1 in a first phase of the charging process and the electrical energy storage device 4 is charged with the second voltage U2 in a second phase of the charging process following the first phase. The two phases of the charging process are alternated or carried out depending on the current state of charge of the electrical energy storage device 4.

For example, the bypass circuit 8 may be able to manage both HV potentials (HV positive potential and HV negative potential) accordingly. This is particularly the case if, in particular, the voltage transformer 7 is able to control both HV potentials and its components are not designed for the current of the direct connection between the charging source 2 and the electrical energy storage device 4. However, if the voltage transformer 7 only influences one of the two potentials, the through-connected potential could be designed for a higher current strength and may thus still require a bypass contactor (isolating element 9).

Figure 2:
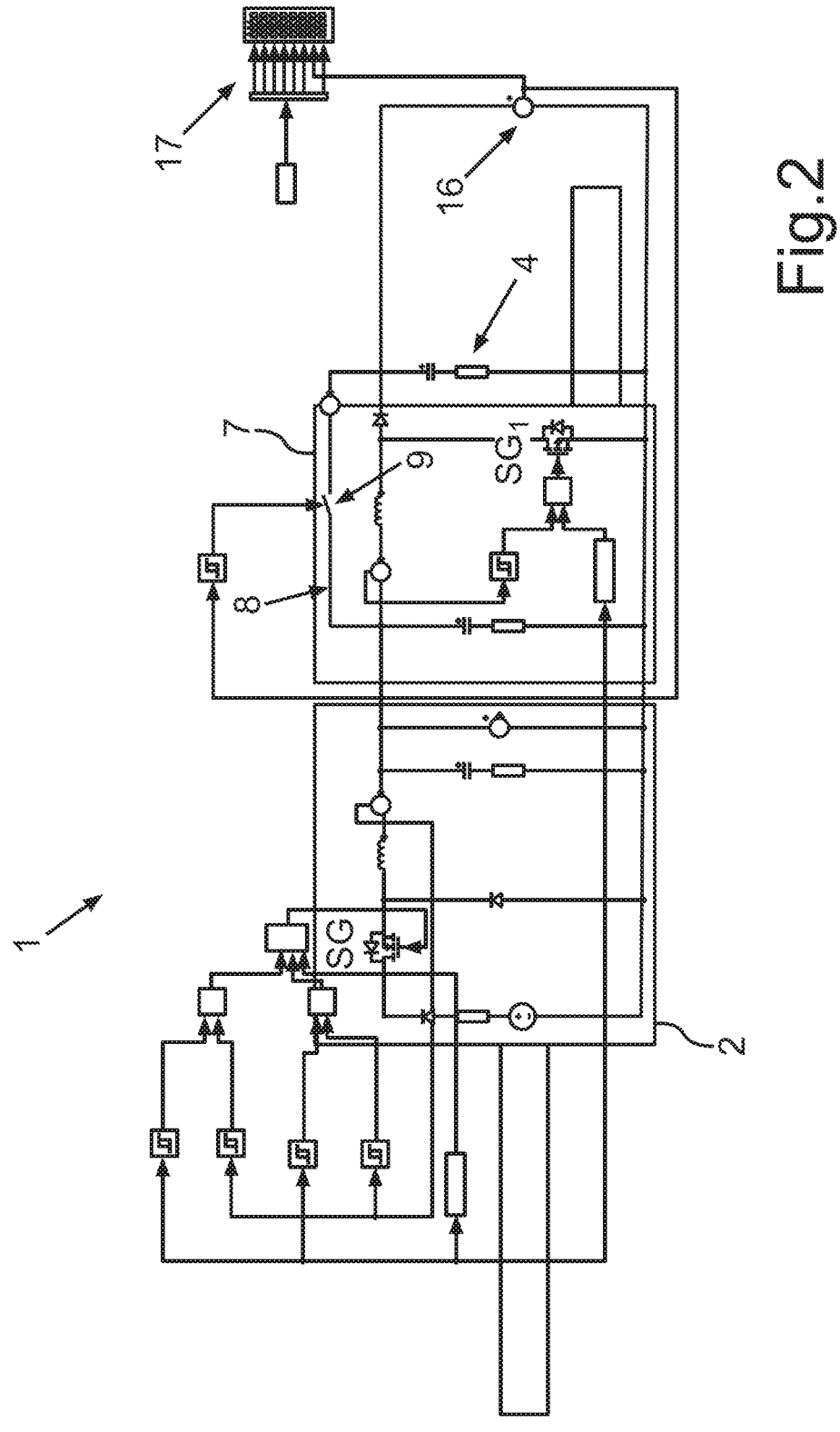
FIG. 2 shows a schematic simulation structure or a simulated switching arrangement of the charging system from FIG. 1.

FIG. 2 shows a schematic simulation structure or a simulated switching arrangement of the charging system 1 from FIG. 1. In particular, the charging source 2 consisting of a voltage source (750 volts) and a buck converter (step-down converter) is shown here. The voltage transformer 7 is shown here as a current-controlled boost converter (step-up converter).

The following problems may occur or arise during a divided charging process of the electrical energy storage device 4. The aim of a charging process is in particular to carry out a continuous charging process without causing a charging interruption. When the isolating elements 9 of the bypass circuit 8 are opened, a charging current of 0 amperes may occur, which would cause a charging interruption. Another disadvantage is that, during the transition between charging from direct coupling to charging via the voltage transformer 7, the isolating elements 9 are opened in such a way that there is a risk of overvoltage due to the energy content present in the output choke of the charging source 2.

This may be caused by an unpowered choke of the voltage transformer 7. Thus, there is also the risk of a charging interruption.

These negative effects will be presented in particular with the simulation set-up. In particular, the simulation is carried out in such a way that, during the first phase of the charging process (up to a battery voltage of the electrical energy storage device 4 of up to 720 volts), a charging current $I_L$ (350 amperes, in particular between 320 amperes and 380 amperes) is fed into the electrical energy storage device 4. When the voltage of the electrical energy storage device 4 is between 720 volts and 750 volts, the charging current $I_L$ is controlled to 110 amperes. In particular, the charging current $I_L$ may be between 110 amperes and 120 amperes. From a voltage level of 750 volts of the electrical energy storage device 4, the buck converter of the charging source 2 is permanently connected through. The isolating elements 9 (DC bypass contactors) open at 730 volts and the voltage transformer 7 begins its function or operation at 735 volts.

Figure 3:
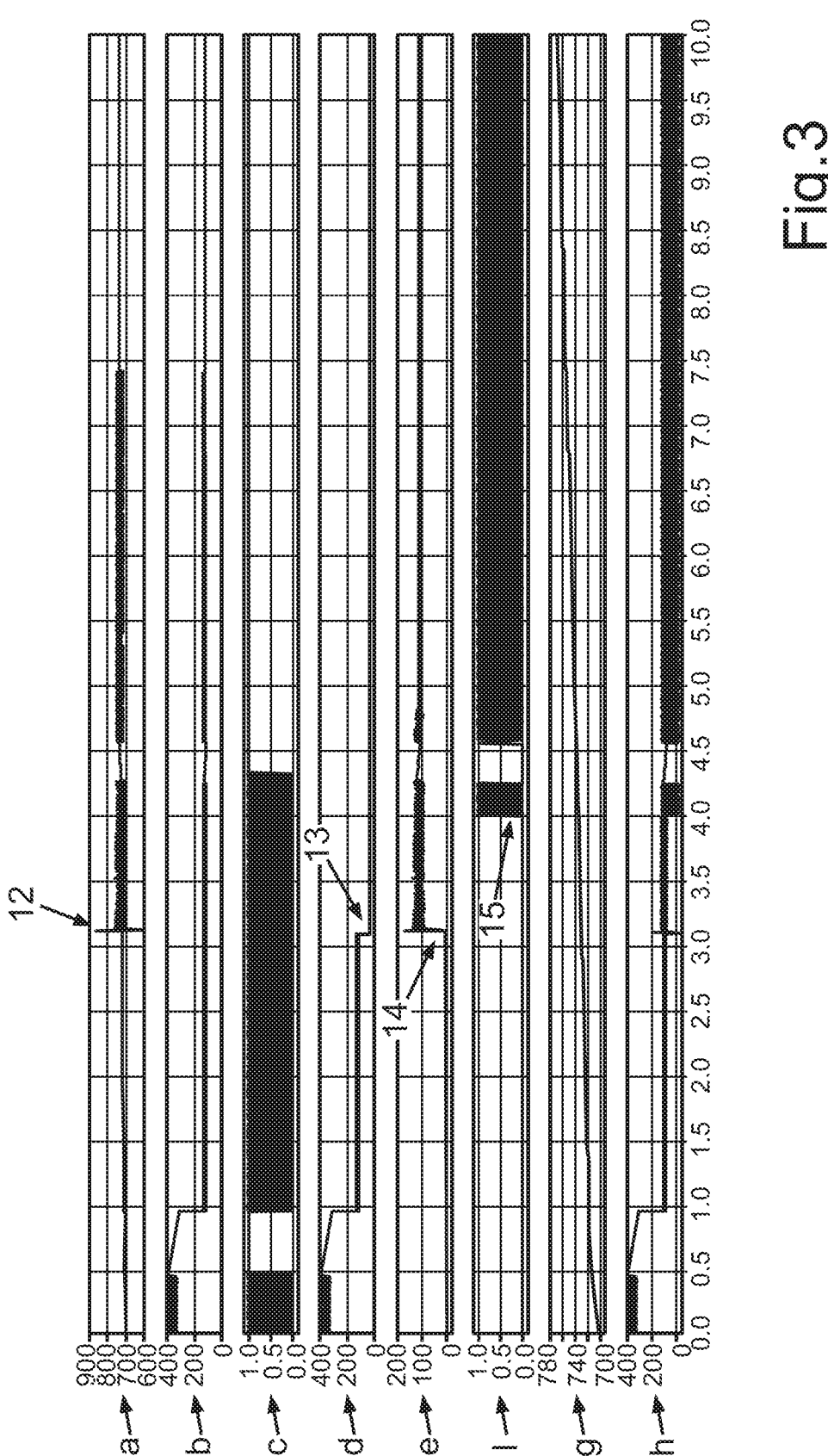
FIGS. 3 and 4 show exemplary simulation processes or simulation sequences of the simulation set-up from FIG. 2.
Figure 4:
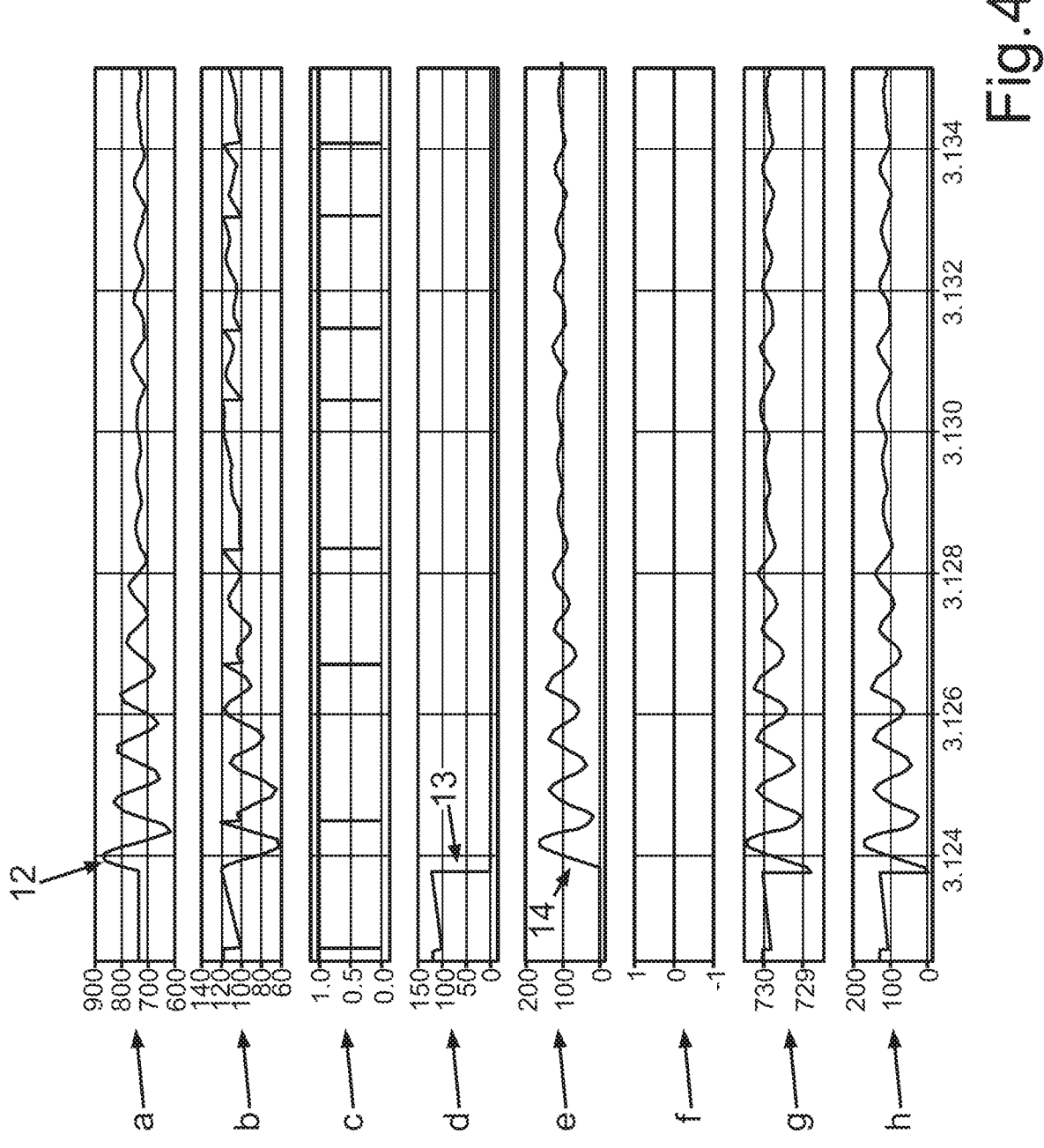

The following figures (FIG. 3 and FIG. 4) show exemplary simulation processes or simulation sequences of the simulation set-up from FIG. 2. In particular, FIG. 3 and FIG. 4 show time sequences. FIG. 4 again shows a time interval of the time sequences from FIG. 3 during the opening or the opening process of the isolating elements 9. In particular, FIG. 4 shows the time of the opening of the isolating elements 9 (bypass contactors).

For example, the voltage curve a shows the profile of the voltage of the charging source 2 over time. A voltage peak 12 can be seen in the corresponding curve a in FIG. 3 and in FIG. 4. In this exemplary simulation, the voltage peak 12 is 864 volts. The original terminal voltage of the charging source 2 was 740 volts.

Thus, an overvoltage of approximately 124 volts has occurred here, which leads to an interruption of the charging process. The reason for the overvoltage is that a current is still impressed in the output choke of the DC charging column (charging source 2). When the contactors are opened, the output capacitances of the charging source 2 and the input capacitances of the voltage transformer 7 (boost converter) are charged before the current flow in the choke L of voltage transformer 7 can start. This charging of the capacitances can be measured as an overvoltage. The current profile in the charging source 2 is shown in both figures (FIG. 3 and FIG. 4) in the curve b. In the curve c, the state of the switching element SG at its gate is shown in each case.

In particular, the current profile in the bypass circuit 8 is shown in the curve d. Here, the time 13 is the time at which the isolating element 9 (bypass contactor) is opened.

The current curve of the choke of the voltage transformer 7 is shown in the curve e. The time 14 shows the time at which the current consumption of the choke L of the voltage transformer 7 begins or starts.

In the curve f, the state of the gate of a switching element SG1 is shown. Here, it can be seen at the time 15 that the clocking of the voltage transformer 7 starts here, in particular at a current of 110 amperes.

The curve g shows the voltage profile of the electrical energy storage device 4 and the curve h shows the current profile of the electrical energy storage device 4.

Figure 5:
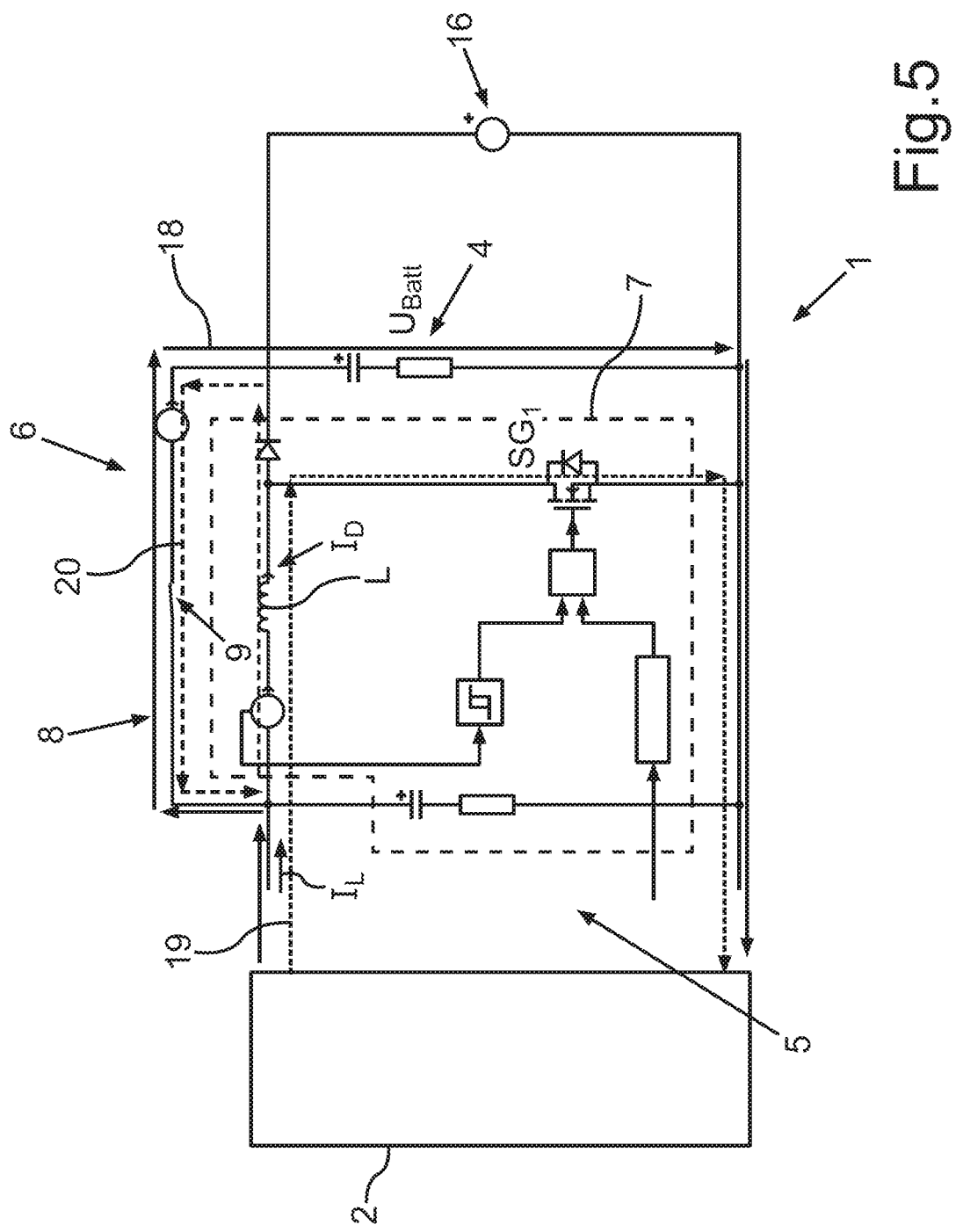
FIG. 5 shows a further schematic block diagram, in particular a partial section, of the charging system from FIG. 1 and FIG. 2.

FIG. 5 shows a further schematic block diagram, in particular a partial section, of the charging system 1 from FIG. 1 and FIG. 2.

In particular, it will now be discussed how, by means of the charging device according to the invention and the associated method, a "smooth" change can be made from directly coupled DC charging to DC charging via the voltage transformer 7. In doing so, it is crucial to ensure that there is no interruption of the DC charging process at any time. For this purpose, it must be ensured that the charging current $I_L$ does not at any time stop, i.e., drop to 0 amperes. Also, on the one hand, the isolating elements 9 must not be opened if the choke L of the voltage transformer 7 is still current-free at this time. It is therefore advisable to make the current values of the charging current $I_L$ and the choke current $I_D$ substantially identical or the same. This prevents voltage peaks when the isolating elements 9 open.

In particular, in the first phase of the charging process of the electrical energy storage device 4, the electrical energy storage device 4 can be charged with the first voltage U1 as charging voltage depending on the charging current $I_L$ of the charging source 2. For example, the electrical energy storage device 4 is thus charged with a voltage of up to 750 volts. In this case, the current battery voltage $U_{Batt}$ of the electrical energy storage device 4 can be continuously determined or ascertained or measured by means of a determination device 16. In particular, the current battery voltage $U_{Batt}$ of the electrical energy storage device 4 is continuously determined during the charging process (DC charging process).

The determination device 16 may be, for example, a voltage measuring device or a measuring circuit or a monitoring unit or an oscilloscope or a voltage-current measuring device or a measuring unit. In particular, the determination device 16 may have several individual units so that currents and/or voltages can be measured at various points in the switching arrangement of the charging system 1.

In particular, the current battery voltage $U_{Batt}$ is determined or ascertained continuously during the charging process. For example, the determination device 16 may be part of the charging device 6. The determined battery voltage $U_{Batt}$ may be compared with the charging voltage (first voltage U1) using an evaluation unit 17 of the charging device 6. If the voltage value of the battery voltage $U_{Batt}$ substantially corresponds, in particular with a tolerance of +/−5 percent, to the voltage value of the charging voltage (first voltage U1), the direct charging process may be terminated via the directly coupled charging source 2 with the electrical energy storage device 4 via the bypass circuit 8 (in particular, a termination process is initiated). At the same time, the voltage transformer 7 may be activated or switched into operation.

Thus, in the second phase of the charging process, which is subsequent to the first phase (in particular subsequent in time), the electrical energy storage device 4 can be charged with a second DC voltage U2 of the voltage transformer 7, which is higher than the charging voltage, depending on the choke current $I_D$ of the voltage transformer 7, which is lower than the charging current $I_L$. For example, the charging current $I_L$ may have a current value of 350 amperes and the choke current $I_D$ a current value of 110 amperes. For example, the second DC voltage U2 may have a voltage value of 850 volts and, by contrast, the first voltage may have a voltage value of 750 volts.

Two variants can be used to change the two charging phases or the phases of the charging process. These are explained below.

In the first variant, the isolating elements 9 are closed at the beginning, so that the charging current $I_L$ can flow via a direct coupling between the charging source 2 and the electrical energy storage device 4. In other words, this is done with the bypass circuit 8. For example, a charging current $I_L$ of 350 amperes can be used for the first phase of the charging process. For example, the current values may lie in the interval between 320 amperes and 380 amperes. This curve is shown with the current flow direction 18.

In a subsequent step, the voltage transformer 7 starts its operation. This occurs in particular at a battery voltage $U_{Batt}$ of approximately 710 volts. In particular, the switching element SG1 is closed. Thus, the build-up of the choke current $I_D$ of the choke L takes place. The current of the choke L is impressed in a current range of 105 amperes to 115 amperes. During this phase the charging current $I_L$ of the charging source 2 remains unchanged (for example at 350 amperes). This is shown with the current flow direction 19. At a voltage value of the battery voltage $U_{Batt}$ of 720 volts, a commanding of the charging current $I_L$ of the charging source 2 is carried out. Thus, a reduction of the charging source current is set to a new current value of a value between the interval of 100 amperes to 120 amperes. The structure of the choke current $I_D$ is shown in particular with the current flow direction 20. For example, the isolating elements 9 (bypass contactors) may then be opened at a voltage value of the battery voltage $U_{Batt}$ of 740 volts. Due to the two substantially equal current values of the charging current $I_L$ and the choke current $I_D$, the second phase of the charging process takes place without negative characteristics (charging interruption).

Figure 6:
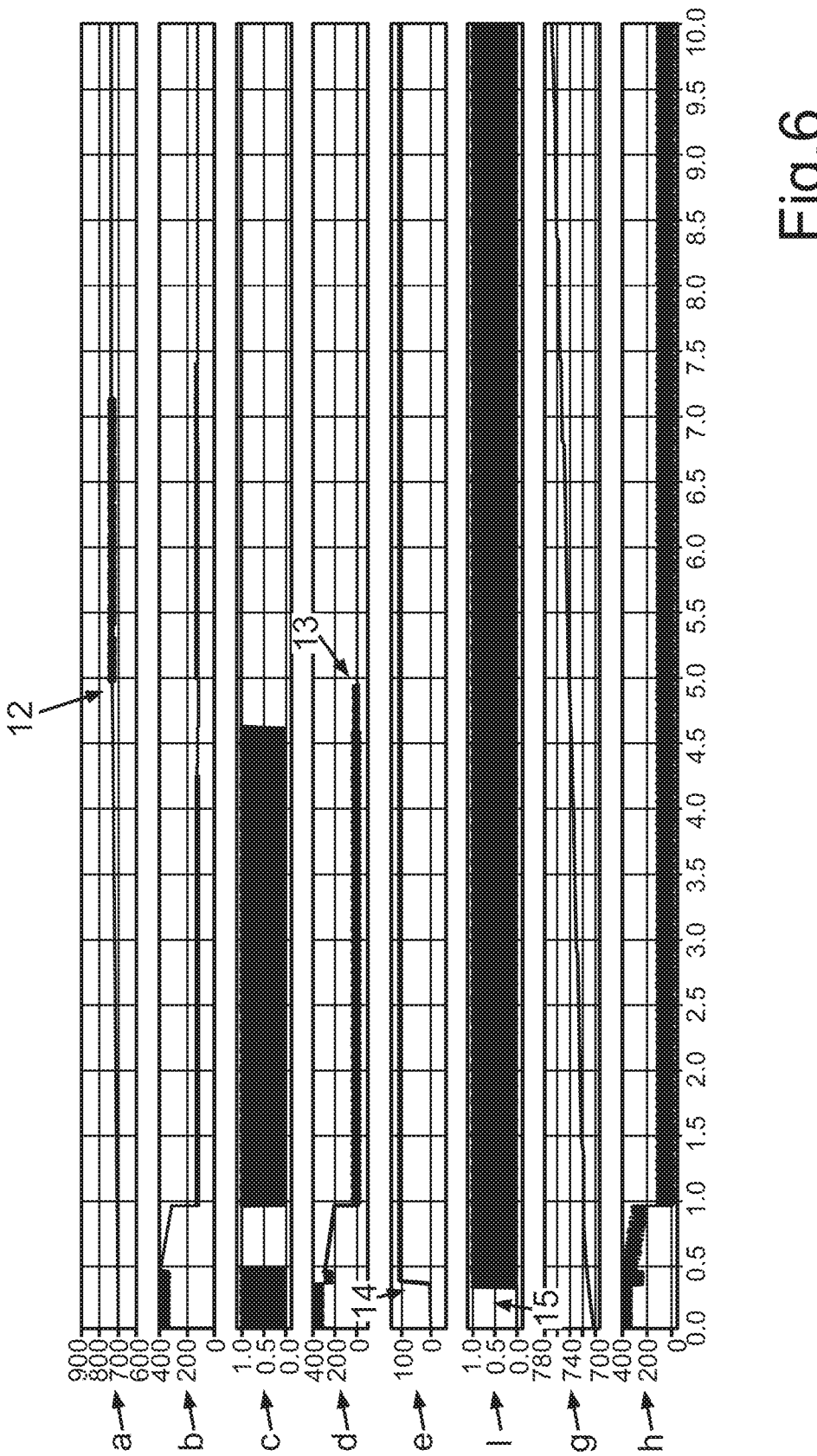
FIGS. 6 and 7 show a simulation procedure of the simulation set-up from FIG. 2.
Figure 7:
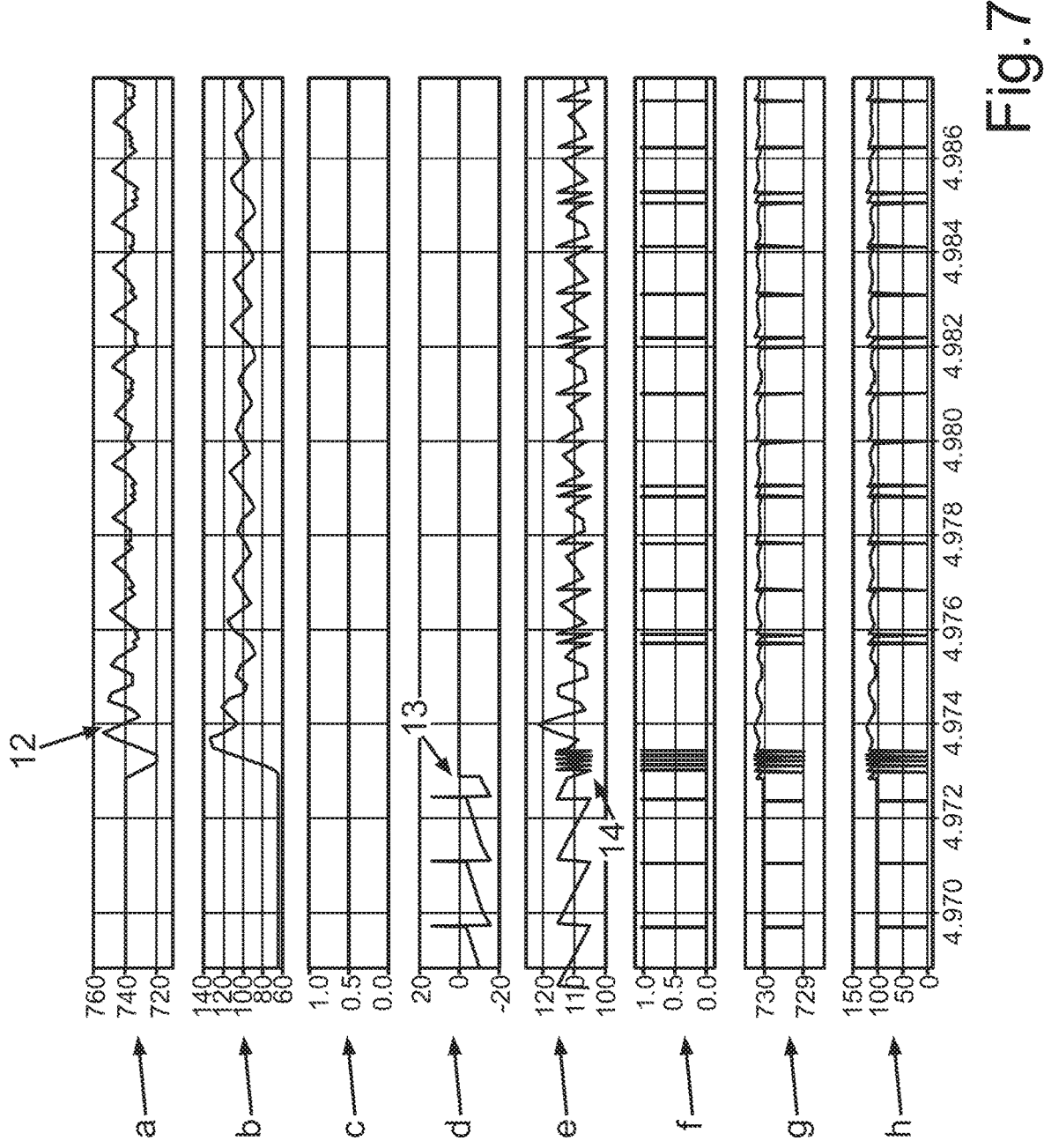

In the two following figures, FIG. 6 and FIG. 7, a simulation procedure of the simulation set-up from FIG. 2 is carried out. The first variant for the smooth change between the first phase of the charging process to the second phase of the charging process is now concerned. The individual sequences or views in the figures of FIG. 6 and FIG. 7 correspond to the same numbering as in the figures of FIG. 3 and FIG. 4, and FIG. 7 again shows a section of a time interval from FIG. 6 in detail, in particular during the opening or opening process of the isolating elements 9. FIG. 7 shows in particular the time of the opening of the isolating elements 9 (bypass contactors).

Only the decisive points as shown in FIG. 3 and FIG. 4 will be discussed here. In particular, it can be seen in the curve a in FIG. 6 and FIG. 7 that the voltage peak 12 is only 754 volts. This means that the overvoltage when the isolating elements 9 are opened is only 14 volts. Due to this low overvoltage, when the contactors (isolating elements 9) open, a current is already impressed in the choke of the voltage transformer 7 which was the same as the current of the charging source 2 (more precisely, the current of the output choke of the charging source 2). Thus, no charging interruption of the charging process is caused here. Furthermore, the start of the current consumption of the choke L on the one hand and the start of the operating consumption of the voltage transformer 7 on the other hand can also be seen in the curves e and f. It can be seen in particular in the curve e at time 14 that the current of the choke L of the voltage transformer 7 is at a comparable level before and after the opening of the bypass contactors. This means that there is no interruption in charging.

Figure 8:
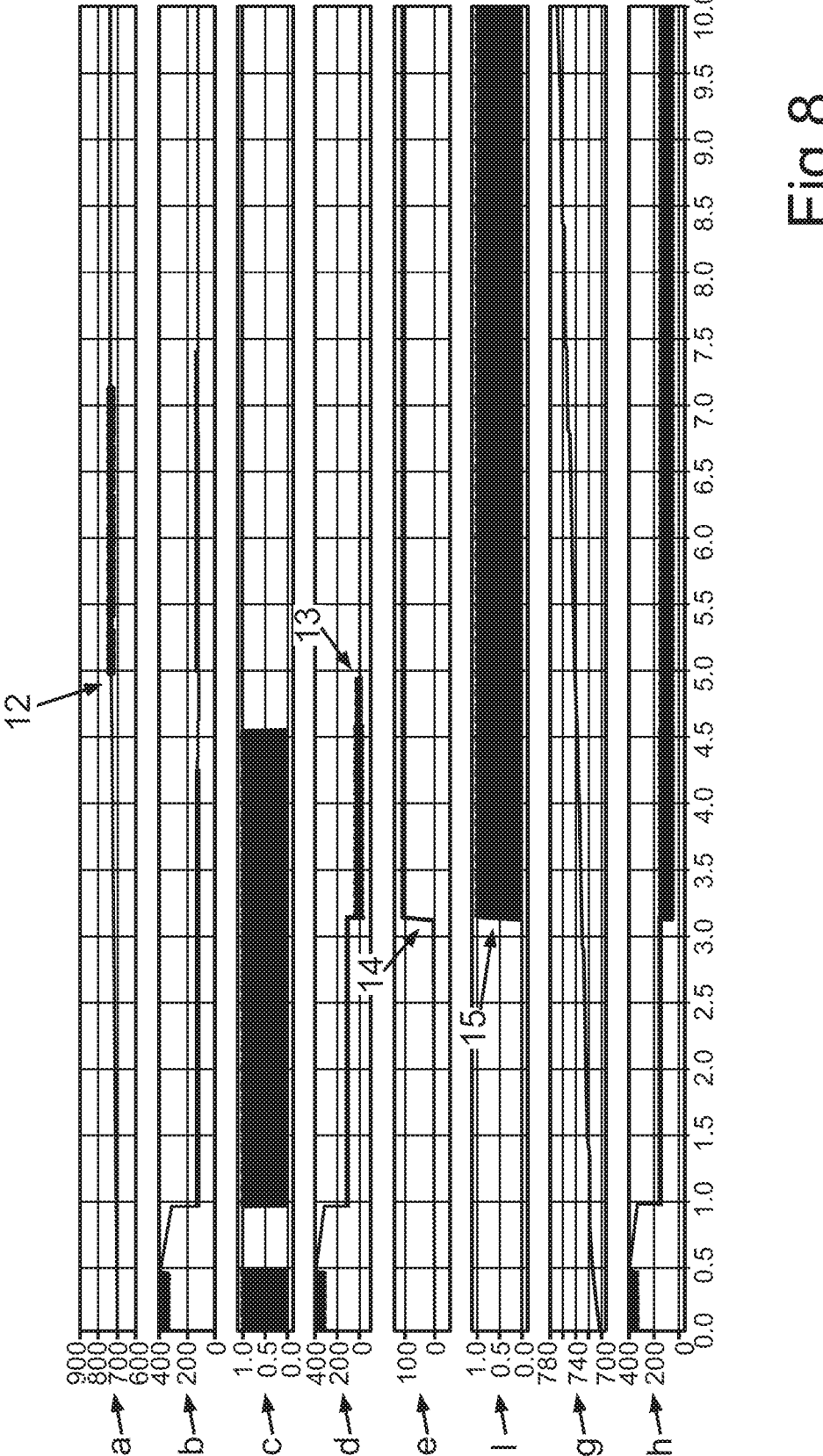
FIGS. 8 and 9 show a simulation run of the simulation set-up from FIG. 2.
Figure 9:
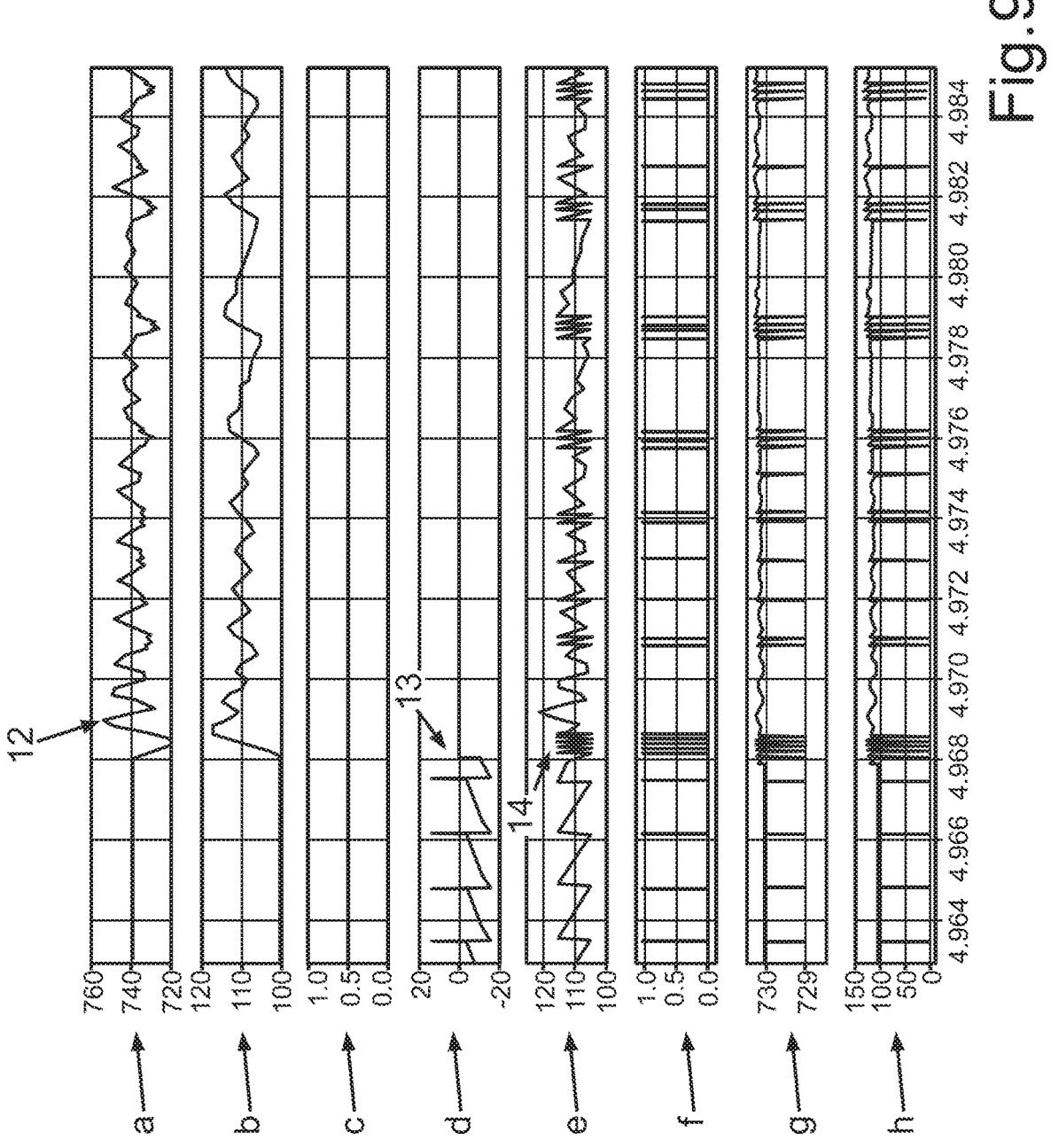

The figures of FIG. 8 and FIG. 9 again show a simulation run of the simulation set-up from FIG. 2. Again, the same numbering in FIG. 8 and FIG. 9 corresponds to that in FIG. 3 and FIG. 4, and FIG. 9 again shows a section of a time interval from FIG. 8 in detail, in particular during the opening or opening process of the isolating elements 9. In particular, FIG. 9 shows here the time of the opening of the isolating elements 9 (bypass contactors).

Only the variant in which the current of the charging source 2 is first reduced and then the voltage transformer 7 is operated or activated is explained.

In this variant, the isolating elements 9 are closed first so that the electrical energy storage device 4 is charged directly via the charging source 9 by means of the charging current $I_L$. The charging current I may be, for example, 350 volts. The charging current $I_L$ may be 350 volts, for example. In particular, the voltage transformer 7 is inactive. The charging current $I_L$ of the charging source 2 is then commanded to a current value with which the electrical energy storage device 2 is subsequently to be charged via the voltage transformer 7 during the second phase of the charging process. For example, the charging current $I_L$ is commanded or reduced to a current value of 110 amperes.

After the current value of the charging current $I_L$ has reached 110 amperes (an example between 100 amperes and 120 amperes is also possible), the voltage transformer 7 is activated or started. The choke current $I_L$ is now impressed into the choke L. In particular, a defined current value (e.g., 110 amperes) is impressed into the choke L. The voltage transformer 7 is then started. In particular, a defined current value (for example 110 amperes) is impressed into the choke L. The charging current $I_L$ of the charging source 2 remains unchanged. In particular, the current value of the charging current $I_L$ and the choke current $I_D$ may be 110 amperes. In particular, the operation of the voltage transformer 7 is started at a battery voltage $U_{Batt}$ of 730 volts. The reduction of the charging column current, on the other hand, already takes place at a battery voltage of 720 volts.

After a choke current of 110 amperes has been impressed and the battery voltage $U_{Batt}$ has reached 740 volts, the isolating elements 9 are opened so that the charging process of the electrical energy storage device 4 can now take place via the voltage transformer 7.

In particular, the transition between the first phase of the charging process to the second phase of the charging process is smooth.

The two representations of the simulation results in FIGS. 8 and 9 show a comparable result to that already seen and explained in FIGS. 6 and 7. Here, too, a voltage peak 12 of 754 volts can be seen in the curve a. Thus, the overvoltage in this variant is also only 14 volts, and therefore the charging process is not interrupted.

In particular, a stabilization of a charging process can be achieved with the provided charging system 1 and the corresponding method. In this case, the current through the voltage transformer 7 is set to the same amperage as via the still closed bypass line before the bypass circuit 8 (bypass line) is opened, since otherwise the charging process is interrupted for safety reasons due to the inductive voltage peak when the contactors in the bypass line are opened. In this case, either the current in the bypass line can first be set to a maximum current strength of the voltage transformer and then the current flow in the voltage transformer can be built up in parallel, or current via the voltage transformer is first built up and then the current in the bypass line is reduced accordingly. With the same current intensity, the bypass line may then be opened without significant voltage peaks occurring.

In particular, at the moment of opening the bypass contactors (isolating elements 9), the current ($I_L$) may be reduced to the current delta of the control of the charging source 2 or the voltage transformer 7 (for example +/−10 amperes instead of >100 amperes). This considerably reduces a holding of the bypass contactors (isolating elements 9).

In particular, the specified current values and voltage values may contain measurement tolerances or measurement errors. Thus, the specified current and voltage values may have a deviation of 5 percent, in particular 10 percent.

The invention claimed is:

1. A method for charging an electrical energy storage device (4) of an electrically driven vehicle (3), comprising:
the electrically driven vehicle (3) is coupled to a charging source (2) external to the electrically driven vehicle (3);
a charging process of the electrical energy storage device (4) is carried out with the coupled charging source (2) external to the electrically driven vehicle (3) and a charging device (6) of the electrically driven vehicle (3);
a battery voltage ($U_{Batt}$) of the electrical energy storage device (4) is determined during the charging process;
the battery voltage ($U_{Batt}$) of the electrical energy storage device (4) is compared with a charging voltage of the charging source (2) external to the electrically driven vehicle (3) by the charging device (6);
a voltage transformer (7) of the charging device (6) of the electrically driven vehicle (3) is operated in dependence on the comparison of the battery voltage ($U_{Batt}$) with the charging voltage;
wherein in a first phase of the charging process of the electrical energy storage device (4), the electrical energy storage device (4) is charged, in dependence on a charging current ($I_L$) of the charging source (2) external to the electrically driven vehicle (3), with a first DC voltage (U1) as the charging voltage of the charging source (2) external to the electrically driven vehicle (3);
wherein in the first phase of the charging process the electrical energy storage device (4) is coupled directly to the charging source (2) external to the electrically driven vehicle (3) by a bypass circuit (8) of the charging device (6) such that the charging current ($I_L$) of the charging source (2) external to the electrically driven vehicle (3) flows directly via the bypass circuit (8) to the electrical energy storage device (4), wherein the voltage transformer (7) is bypassed in the first phase of the charging process by the bypass circuit (8);
wherein in a second phase of the charging process following the first phase, the electrical energy storage device (4) is charged, in dependence on a choke current ($I_D$) of the voltage transformer (7) which is lower than the charging current ($I_L$), with a second DC voltage (U2) of the voltage transformer (7) which is higher than the charging voltage;
wherein the bypass circuit (8) is switched current-free by an isolating element (9) in the second phase of the charging process, as a result of which the current flow of the charging current ($I_L$) of the charging source (2) external to the electrically driven vehicle (3) to the electrical energy storage device (4) via the bypass circuit (8) is interrupted and the charging current ($I_L$) flows from the charging source (2) via the voltage transformer (7) such that the electrical energy storage device (4) is charged indirectly via the voltage transformer (7);
wherein in the second phase of the charging process, the charging current ($I_L$) of the charging source external to the electrically driven vehicle (3) is adapted in dependence on the choke current ($I_D$), wherein a current value of the charging current ($I_L$) is adapted to a current value of the choke current ($I_D$).

2. The method according to claim 1, wherein the voltage transformer (7) is operated in dependence on the battery voltage ($U_{Batt}$) of the electrical energy storage device (4)

such that the choke current (Ip) is impressed in a choke (L) of the voltage transformer (7) in dependence on the charging current ($I_L$).

3. A charging system (1) for charging an electrical energy storage device (4) of an electrically driven vehicle (3), comprising:
a charging source (2) external to the electrically driven vehicle (3) for providing a charging voltage;
a charging port (5) of the electrically driven vehicle (3) for coupling the electrically driven vehicle (3) to the charging source (2) external to the vehicle (3);
a charging device (6) of the electrically driven vehicle (3) for performing a charging process of the electrical energy storage device (4);
a determination device (16) for determining a battery voltage ($U_{Batt}$) of the electrical energy storage device (4) during the charging process;
an evaluation unit (17) which is configured to compare the battery voltage ($U_{Batt}$) of the electrical energy storage device (4) with the charging voltage of the charging source (2) external to the electrically driven vehicle (3); and
a voltage transformer (7) of the charging device (6) for providing a choke current ($I_D$) lower than the charging current ($I_L$) in dependence on a comparison between the battery voltage ($U_{Batt}$) and the charging voltage;
wherein the charging device (6) has a bypass circuit (8) for charging the electrical energy storage device (4) in dependence on the charging current ($I_L$);
wherein the bypass circuit (8) is connected between a positive potential of the charging source (2) external to the electrically driven vehicle (3) and a positive potential of the electrical energy storage device (4) and is connected between a negative potential of the charging source (2) external to the electrically driven vehicle (3) and a negative potential of the electrical energy storage device (4);
wherein the charging device (6) is configured such that, in a first phase of the charging process of the electrical energy storage device (4), the electrical energy storage device (4) can be charged in dependence on a charging current ($I_L$) of the charging source (2) external to the electrically driven vehicle (3) with a first direct voltage (U1) as charging voltage of the charging source (2) external to the electrically driven vehicle (3) of the electrical energy storage device (4) via the bypass circuit (8);
wherein the charging device (6) is configured such that, in a second phase of the charging process following the first phase, the electrical energy storage device (4) is charged in dependence on the choke current ($I_D$) of the voltage transformer (7) with a second DC voltage (U2) of the voltage transformer (7) which is higher than the charging voltage;
wherein in the second phase of the charging process the bypass circuit (8) is switched current-free by an isolating element (9), as a result of which the current flow of the charging current ($I_L$) of the charging source (2) external to the electrically driven vehicle (3) to the electrical energy storage device (4) via the bypass circuit (8) is interrupted and the charging current ($I_L$) flows from the charging source (2) via the voltage transformer (7) such that the electrical energy storage device (4) can be charged indirectly via the voltage transformer (7);
wherein the charging current ($I_L$) of the charging source external to the electrically driven vehicle (3) can be adapted in dependence on the choke current ($I_D$), wherein a current value of the charging current ($I_L$) can be adapted to a current value of the choke current (Ip).

4. The charging system (1) according to claim 3, wherein a first connection side of the bypass circuit (8) is connected to a primary side of the voltage transformer (7) and a second connection side of the bypass circuit (8) is connected to a secondary side of the voltage transformer (7).

5. The charging system (1) according to claim 4, wherein the isolating element (9) is connected between the first connection side of the bypass circuit (8) and the second connection side of the bypass circuit (8) and wherein the voltage transformer (7) can be bridged with the isolating element (9).

6. The charging system (1) according to claim 3, wherein the voltage transformer (7) is a current-controlled step-up converter.

\* \* \* \* \*